United States Patent [19]
Heath et al.

[11] Patent Number: 5,231,646
[45] Date of Patent: Jul. 27, 1993

[54] COMMUNICATIONS SYSTEM

[75] Inventors: William A. Heath, Butler; Keith A. Mayers, Wayne; Raymond B. Chadwick, Kearny, all of N.J.

[73] Assignee: Kyros Corporation, Butler, N.J.

[21] Appl. No.: 851,321

[22] Filed: Mar. 16, 1992

[51] Int. Cl.$^5$ ........................ H04K 1/00; H04L 27/10
[52] U.S. Cl. ........................................................ 375/1
[58] Field of Search ................... 375/1; 455/54.1, 56.1

[56] References Cited

U.S. PATENT DOCUMENTS

| | | | |
|---|---|---|---|
| 4,144,496 | 3/1979 | Cunningham et al. | 455/54.1 |
| 4,549,293 | 10/1985 | Christian et al. | 455/56.1 |
| 4,901,307 | 2/1990 | Gilhousen | 375/1 |
| 5,073,900 | 12/1991 | Mallinckrodt | 375/1 |
| 5,103,461 | 4/1992 | Tymes | 375/1 |
| 5,123,029 | 6/1992 | Bantz | 375/1 |
| 5,128,960 | 7/1992 | van Driest et al. | 375/1 |
| 5,161,168 | 11/1992 | Schilling | 375/1 |
| 5,166,951 | 11/1992 | Schilling | 375/1 |

Primary Examiner—Salvatore Cangialosi
Attorney, Agent, or Firm—Alfred C. Hill

[57] ABSTRACT

A communication system comprising a plurality of transceivers each being connected to selected ones of data inputs and at least one unidirectional antenna, each of the transceivers having a first transmitter coupled to the unidirectional antenna transmitting first signals at a first frequency to others of the plurality of transceivers according to a predetermined protocol and a first receiver coupled to the unidirectional antenna receiving second signals at a second frequency from others of the plurality of transceivers according to the predetermined protocol, the first and second frequencies being different; and a relay having an omnidirectional antenna in focused communication with the unidirectional antennas of the plurality of transceivers, a second receiver coupled to the omnidirectional antenna to receive the first signals according to the predetermined protocol and a second transmitter coupled to the second receiver and the omnidirectional antenna to convert the first signals to the second signals and to transmit the second signals to the others of the plurality of transceivers according to the predetermined protocol, each of the first and second signals including digital data combined with a pseudo-random spreading code having N bits common to all of the plurality of transceivers where N equals a predetermined number greater than two.

18 Claims, 6 Drawing Sheets

FIG. 1

FIG. 2
SYMBOLS EMPLOYED IN FIGS. 1, 3, 4 AND 5

A = ARCNET CARD
E = ETHERNET CARD
PC = PERSONAL COMPUTER
FS = FILE SERVER
S = SATELLITE WITH UNIDIRECTIONAL ANTENNA
R = RELAY WITH OMNIDIRECTIONAL ANTENNA
⊕ = EXCLUSIVE OR LOGIC

COMMUNICATIONS SYSTEM

BACKGROUND OF THE INVENTION

The present invention relates to communications systems and more particularly to a digital radio communications system capable of being employed in a small geographic area, such as a local area network, and in a large geographic area, such as a long distance communications system.

A local area network is a data communications system which links computers, word processors, printers and other related equipment as well as digitally encoded audio signals within a small geographic area. The local area networks allow computers to exchange information. A local area network enables computers to share resources and communicate with computers in other networks, including minicomputers and mainframe computers. In a local area network, information processing devices, such as desktop computers, have access to one another and to hard disk storage, databases, communications software and printers. The use of local area networks has grown at a rapid rate in the past decade as computer systems have become prevalent in the workplace.

Local area networks consist of both hardware and software. In its common form, a local area network has the following elements: (1) network interface units, which functionally and physically connect workstations to the network, may be a printed circuit card inserted into the computer, or may be a separate box attached with a plug to the computer; (2) software, which manages and coordinates the flow of information on the network; (3) file server computer, which acts as the system control unit; and (4) in the past twisted pair wire, coaxial cable or fiber optic cable have been employed to link the components of the local area network.

In a conventional local area network, network interface cards embedded in each computing device control the transmission of data. As originally configured, data is transmitted over coaxial cable, twisted pair wire or fiber optic cable.

In order for a local area network to function properly, all connected devices must obey rules or "protocols" that govern access to the network and control communications with other devices in the local area network. The International Standards Organization (ISO) has developed a framework for network protocols so that incompatible devices will be able to communicate. The ISO model separates the communications and computing services provided by local area networks into seven hierarchical layers. Standards for the two lowest layers in the ISO model, the physical layer and the data link layer, set parameters for media, transmission speed, physical architecture and access method of the local area network. The five higher layers in the ISO model, the software layers, address the methods by which information is reliably transmitted between sending and receiving systems, and the way such information is processed and presented to the user. The data link layer forms a bridge between hardware and software in the local area network. The software layers control the exchange of information.

Local area networks generally use three basic architectures: star, ring and bus. In a star type network, each device is connected with a separate link through a central file server. An example is ATT's STARLAN. In a ring, such as IBM's TOKEN RING, devices are connected to one another in a closed loop. In a bus architecture, devices are attached to a single open-ended cable. Examples are ETHERNET and ARCNET.

While originally local area networks had their computers connected to one another through twisted pair wires, coaxial cables or fiber optic cables, more recently the computers have been connected in a local area network by the means of radio frequency (RF) waveforms. Such a radio communications system for a local area network has been disclosed in U.S. Pat. No. 4,789,983. In this patent there is disclosed a local area network using RF waves rather than wires to connect users to a central node or station. The users timeshare different RF frequencies for transmission and reception. In this local area network, the users operate one at a time, do not employ focused antennas and the interference and multipath fading is overcome by employing diversity techniques.

The communications system of the present invention is not limited to local area networks, but rather can also be used in long distance communications systems of the type employing relay stations for line-of-sight communications over a large geographic area or employing an orbiting satellite as the relay station for the long distance communication system. A satellite communication system is disclosed in U.S. Pat. No. 3,611,435 which discloses a satellite communication system where each terminal of a system transmits data to a satellite repeater or relay station on a carrier signal which has a frequency different for each terminal and each terminal of the system receives data on a carrier signal which is different for each terminal and different for each of the transmitted carrier signals.

SUMMARY OF THE INVENTION

An object of the present invention is to provide a communications system of the digital type which may be employed in either a local area network or a long distance communication system.

Another object of the present invention is to provide a communication system for a local area network which links the computers therein with RF waves, instead of coaxial cables, twisted pair wires or fiber optic cables.

A further object of the present invention is to provide a local area network using a predetermined protocol to connect nodes with wireless RF links instead of hard wire links.

Still another object of the present invention is to provide a communication system capable of being employed in a local area network and a long distance communication system employing spread spectrum techniques.

A feature of the present invention is the provision of a local area network comprising a plurality of satellites disposed within a small geographic area, each of the plurality satellites being connected to selected ones of computers, word processors, printers, and other related equipment, as well as digitally encoded audio signals, and at least one unidirectional antenna, each of the plurality of satellites having a first transmitter coupled to the unidirectional antenna transmitting first signals at a first frequency to others of the plurality of satellites according to a predetermined protocol and a first receiver coupled to the unidirectional antenna receiving second signals at a second frequency from others of the plurality of satellites according to the predetermined protocol, the first and second frequencies being different; and a relay disposed in the small geographic area having an omnidirectional antenna in communication with the unidirectional antennas of the plurality of satellites, a second receiver coupled to the omnidirectional antenna to receive the first signals according to the predetermined protocol and a second transmitter coupled to the second receiver and the unidirectional antenna to convert the first signals to the second signals and to transmit the second signals to the others of the plurality of satellites according the predetermined protocol.

Another feature of the present invention is the provision of a long distance communication system comprising a plurality of transceivers disposed in a large geographic area, each of the plurality of transceivers having at least one unidirectional antenna, a first transmitter coupled to the unidirectional antenna to transmit first signals at a first frequency to others of the plurality of transceivers according to a predetermined protocol and a first receiver coupled to the unidirectional antenna to receive second signals at a second frequency from the others of the plurality of transceivers according to the predetermined protocol, the first and second frequencies being different; and a relay transceiver disposed in the large geographic area having an omnidirectional antenna in communication with the unidirectional antennas of the plurality of transceivers, a second receiver coupled to the omnidirectional antenna to receive the first signals according to the predetermined protocol and a second transmitter coupled to the second receiver and the omnidirectional antenna to convert the first signals to the second signals and to transmit the second signals to the others of the plurality of transceivers according to the predetermined protocol.

BRIEF DESCRIPTION OF THE DRAWING

Above-mentioned and other features and objects of the present invention will become apparent by reference to the following description taken in conjunction with the accompanying drawing, in which.

DESCRIPTION OF THE PREFERRED EMBODIMENTS

Figure 1:
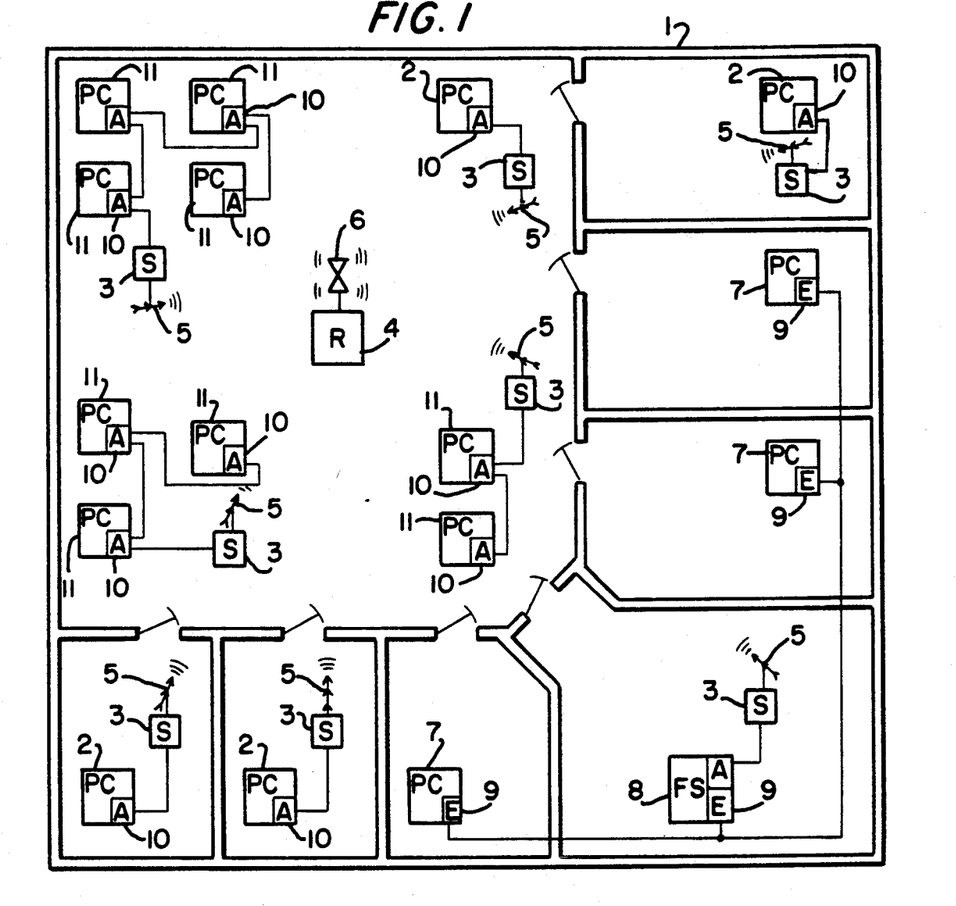
FIG. 1 is a block diagram illustrating a local area network disposed in a small geographic area employing a communication system in accordance with the principles of the present invention.
Figure 2:
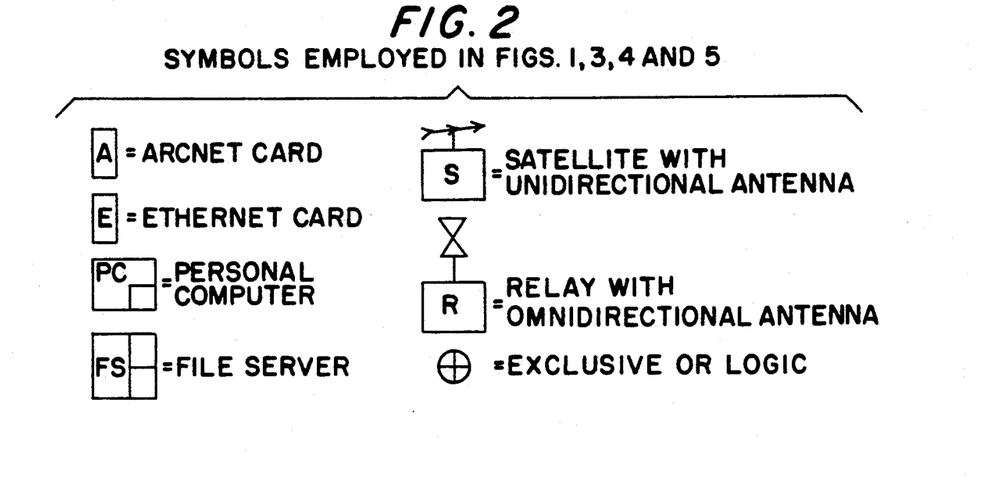
FIG. 2 is a diagram defining the symbols employed in FIGS. 1,3,4 and 5.

Referring to FIG. 1, the communication system of the present invention is illustrated as being included in a local area network covering a small geographic are such as a building 1. Personal computers 2 are interconnected for the transmission of information therebetween by means of satellites 3, relay 4 and focused antennas including unidirectional antennas 5 and omnidirectional antenna 6 rather than by the hardwired connections employed in the prior art. While it is illustrated that personal computers 2 are interconnected for transfer of information therebetween by the radio waves of satellites 3 and relay 4, word processors, printers and other related equipment could also be interconnected for information transference by satellites 3 and relay 4. In accordance with the principles of the present invention, satellites 3 all transmit at a first frequency and receive at a second frequency different than the first frequency. In addition the information transmitted from and received at satellites 3 utilizes unidirectional antenna 5 in a focused communication with an omnidirectional antenna 6 coupled to the relay 4. As illustrated in FIG. 1 some of the personal computers, such as personal computers 7 are tied together by hardwiring, such as by coaxial cable, twisted pair wire or a fiber optic fiber arrangement. These computers 7 are hardwired to file server 8 which then is coupled to satellite 3, information thereof being transmitted on unidirectional antenna 5 to omnidirectional antenna 6 of relay 4. The operation of personal computers 7 is determined by the ETHERNET protocol provided by the ETHERNET cards 9 while the transmission of the information from personal computers 2 is controlled by any predetermined protocol, such as the ARCNET protocol provided by the ARCNET card 10 associated with each of the personal computers 2. While the ARCNET protocol has been employed in the hardwired local area network any predetermined protocol can be employed in the local area network in accordance with the principles of the present invention employing RF waves to interconnect a plurality of personal computers for transfer of information therebetween. According to the ARCNET protocol, data communication links between as many as 255 computers, word processors, printers and other related equipment can be interconnected. An ARCNET system has electronic boards that plug into each computer 2 in the network and the ARCNET board has an intelligent controller which directs the flow of information to and from its host computer. The ARCNET controllers communicate with short burst of information called packets. There are two general types of packets, data packets and message packets. Data packets vary in length up to 4,064 data bits. The controllers use message packets to send signals to each other.

In an ARCNET protocol, only one controller may transmit at a time. Any of the other controllers connected to the network may receive the transmission. The controllers take turns sending data packets. If a controller, in turn, has information to transmit it sends a packet. It then passes the right to transmit on to the next controller. The controllers use message packets to verify that the destination is ready to accept a transmission and to insure that the next controller receives the right to transmit.

When a computer 2 has information to send, its ARCNET controller 10 waits for the right to transmit. As soon as it obtains the right to transmit, it sends a message to the destination via relay 4 to verify that the controller at the destination is ready to receive a packet. If the receiving controller can accept the packet, it sends an "acknowledge" message and the sending computer transmits a packet. If the receiving controller can not accept the packet, it returns a "negative acknowledge" message. The sending controller then passes the right to transmit to another computer on the network. When the receiving controller accepts a transmission, it tells the sending controller if it has received the packet successfully. If transmission was successful, the sending controller passes the right to transmit in the normal manner. If transmission was unsuccessful, the receiving controller does nothing. Eventually the sending controller will get another chance to rebroadcast the packet.

In addition to employing a first transmission frequency for each of the satellites and a second receive frequency for each of the satellites to enable transmission of information between the computers 2, the communication system in accordance with the principles of the present invention employs spread spectrum techniques to substantially reduce interference and multipath fading problems along with the use of focused antennas, such as omnidirectional antenna 6 at the relay 4 and unidirectional antenna 5 at each of the satellites 3.

Spread spectrum communications systems use special modulation techniques that spread the energy of the signal being transmitted over a very wide band. The information to be conveyed is modulated onto a radio frequency carrier by some conventional technique, such as amplitude modulation, frequency modulation or phase modulation, and the bandwidth of the signal is then deliberately widened by means of a spreading code or function. The spectrum spreading technique used in the transmitter is duplicated in the receiver to enable detection and decoding of the signal. Spread spectrum systems offer two important technological advantages over conventional transmission systems. First, the spreading technique reduces the power density of the signal at any frequency within the transmitted band, thereby reducing the probability of causing interferences to other signals occupying the same spectrum. Second, the signal processor in spread spectrum systems tends to suppress undesired signals, thereby enabling such signals to tolerate strong interfering signals. This results in significantly higher signal-to-noise ratios than can be achieved by conventional systems, such as amplitude modulation that use no bandwidth spreading. The improvement in signal-to-noise ratio is termed "processing gain" and is greater than that achieved by the diversity techniques of the prior art.

Direct sequence spread spectrum systems, such as employed in the communication system of the present invention, combine the information signal, which is digital, with a much faster stream of binary code. The combined information and code signal is then used to modulate an RF carrier. Since the binary spreading code dominates the modulating function, it is the direct cause of the wide spreading of the transmitted signal. The spreading code is a fixed-length, pseudo-random sequence of bits, with random characteristics, but not truly random. The system continuously recycles the same binary spreading code.

The spread spectrum system's performance in terms of minimizing interference to other signals and improving processing gain, is determined in large part by attributes of the spreading code used to spread the RF carrier. The degree to which interference to other signals is reduced depends on the length of the spreading code, i.e., the number of bits, and the relative rate at which the bits of the spreading code are generated compared to the rate data bits are transmitted.

While the communications system of the present invention preferably employs a longer code, the description and illustrations employed in the present application will be concerned with a 7-bit spreading code for purposes of describing the operation of the communications system of the present invention.

As previously mentioned with respect to FIG. 1, the local area network in accordance with the principles of the present invention employs satellites 3 and relay 4 for the transfer of information between personal computers. One or more personal computers 2 may be connected to each satellite, for a total of 255 personal computers connected to all satellites 3. Standard ARCNET wired local area network interface cards 10 are plugged into each personal computer 2. ARCNET is an established local area network protocol that operates at 2.5 Mbps over cable. The cables connecting the personal computers 2 to the satellite 3 are standard twisted pair cables with RJ11 telephone type modular connectors. More than one personal computer can be connected to a single satellite 3 by daisy-chaining personal computers together in a single string as illustrated by personal computers 11. Network access and protocol is identical for all personal computers 2 and 11, whether linked by wire or by radio waves.

The Federal Communications Commission has allocated three different bands for spread spectrum radio communication, 902-928 MHz, 2400-2483 MHz and 5725-5875 MHz. While the communication system of the present invention can employ any of these bands, or any other band, the preferred band is the 2400 MHz (2.4 GHz (gigahertz)) and the 5725 MHz (5.7 GHz) bands.

The relay unit 4 is placed centrally with respect to all satellites 3 in the local area network. The satellites 3 transmit to the relay 4 on the 2.4 GHz band. The relay 4 receives on the 2.4 GHz band and rebroadcasts to the satellites 3 on the 5.7 GHz band. Satellites 3 use highly directional antennas on both transmit and receive while the relay 4 uses omnidirectional antennas on both receive and rebroadcast.

There are three advantages to the communications system of the present invention as opposed to using individual omnidirectional antennas of the prior art at each satellite 3 without a relay. First, the focused antennas on the satellites 3 achieve greater signal penetration through office walls than would omnidirectional antennas. Second, the directional antennas on the satellites 3 focus most of the radiated power toward the center of the network. This reduces interference between neighboring networks.

Third, and most critical to the operation of the local area network, the relay system solves the problem of multipath interference. High frequency radio transmissions reflect off physical objects within the office environment. This effect, called multipath, can create multiple pathways through which a transmitted signal can reach a receiver. Signals received from different paths can interfere with or even cancel each other. As a result of this interference there are some placements of receiving and transmitting antennas for which reception is poor. An antenna position which produces excellent reception may be just a few inches away. For a single pair of omnidirectional antennas it is not difficult to find relative positions for which reception is good. However, as you add additional antennas to a network, finding a position for each antenna which provides good reception with all other antennas in the network becomes more and more difficult. In a relay system as presented herein, each satellite has one point of focus, omnidirectional antenna 6 of relay 4. Thus, each satellite antenna 5 added to the network is no more difficult to position than the first. Moreover, a focused antenna on a satellite 3 is less susceptible to multipath interference than an omnidirectional antenna at the satellite because it is not sensitive to radiation received from direction outside its narrow angle of focus.

Figure 3:
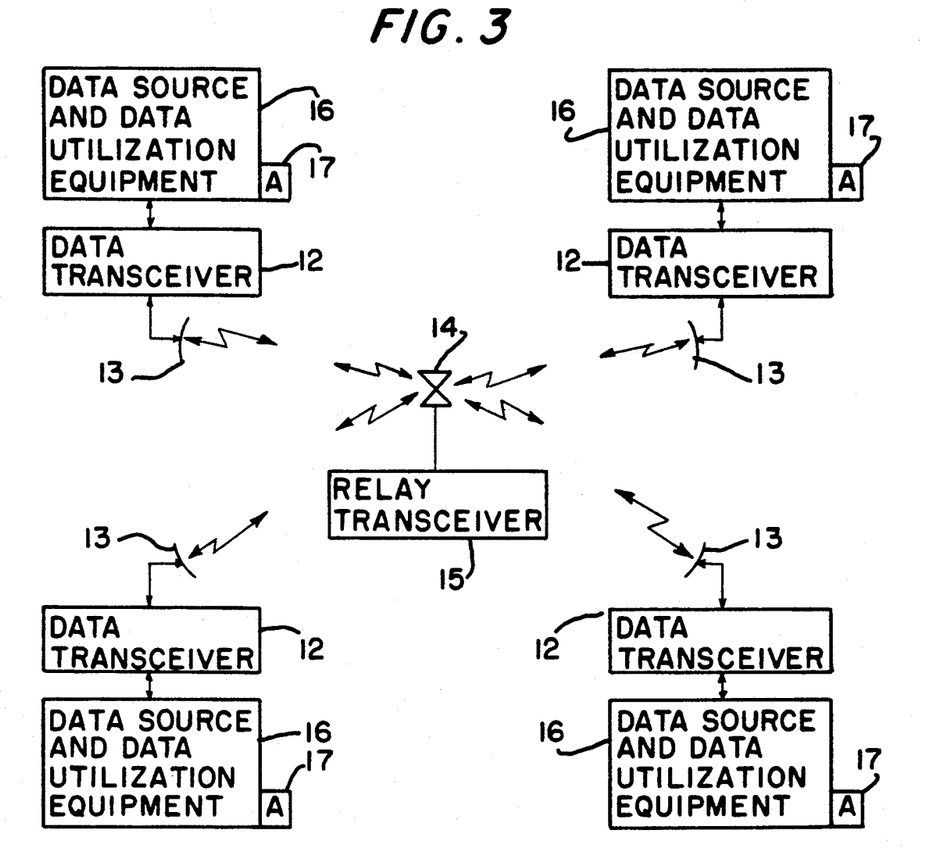
FIG. 3 is a block diagram of a long distance communication system in a large geographic area employing the communication system of the present invention.

Referring to FIG. 3, the communication system of the present invention can be employed in a large geographical area including a data transceivers 12 with unidirectional antennas 13 being focused upon omnidirectional antenna 14 of the relay receiver 15. The data transceivers 12 are coupled to the data source and data utilization equipment 16 with the protocol of this large area system being again dictated by a predetermined protocol, such as, for example, an ARCNET protocol provided by ARCNET card 17. Everything that has been stated with respect to the local area network of FIG. 1 applies to the operation of the communication system in a large geographic area as illustrated in FIG. 3. As in the local area network of FIG. 1 the transceivers 12 transmit on a first frequency, such as 2.4 GHz, and receive on a second frequency different than the first frequency, such 5.7 GHz. The relay receiver 15 receives the first frequency and converts or rebroadcasts the data on the first frequency to the second frequency for transmission to all of the transceivers 12. Also the spread spectrum technique mentioned hereinabove with respect to FIG. 1 is employed in the large geographic area communications system of FIG. 3.

Figure 4:
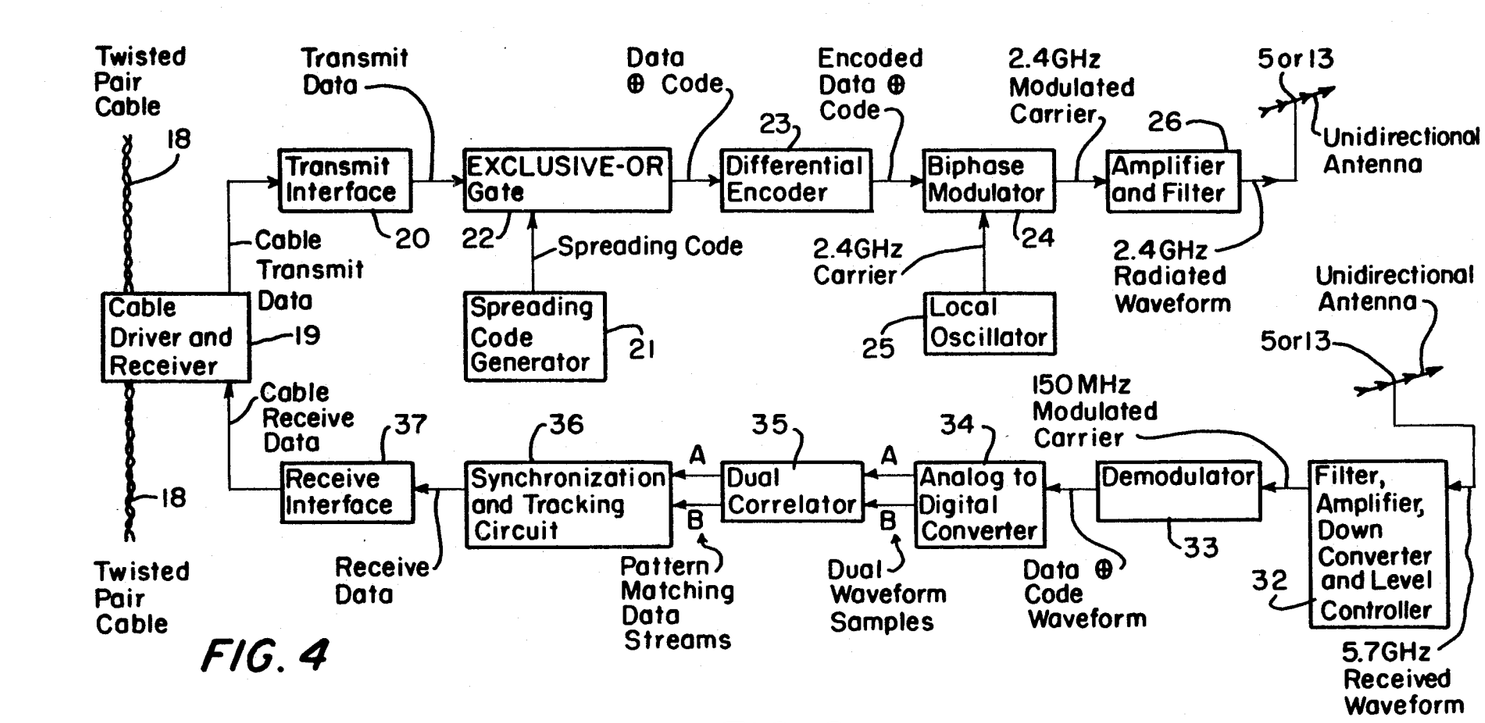
FIG. 4 is a block diagram of the satellite of FIG. 1 and the data transceiver of FIG. 3.

Referring to FIG. 4, one embodiment of the satellite 3 of FIG. 1 and the transceiver 12 of FIG. 3 is illustrated in block diagram form. The twisted pair cables 18 connect the ARCNET card 10 of FIG. 1 and ARCNET card and 17 of FIG. 3 to the satellite 3 of FIG. 1 and the transceiver 12 of FIG. 3. A simple device, called a balun, can easily adapt an ARCNET card with a coaxial connector to twisted pair. The controllers within each ARCNET card 10 or 17 will follow a protocol which insures that only one ARCNET card in the communications system is transmitting data at any given time. Data comes over a twisted pair cable 18 as a pulse train in packets up to 4,064 data bits long.

The twisted pair cable 18 is connected to a cable driver and receiver 19 which translates the data of the pulse train on the twisted pair cable 18 to digital data for transmission. The driver and receiver 19 also translates the received data into a pulse train which drives the twisted pair cable 18. The transmit interface 20 buffers transmit data.

Figure 5:
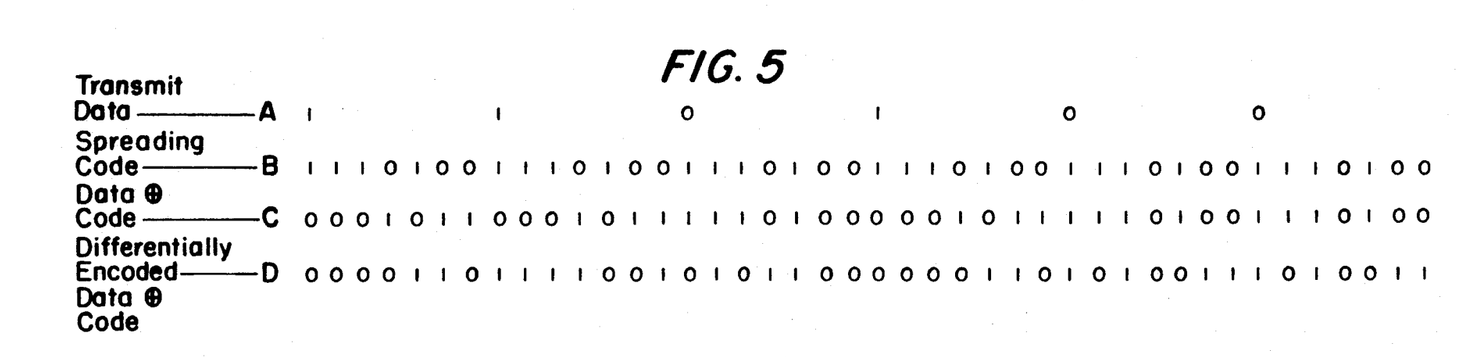
FIG. 5 is a timing diagram illustrating the output of certain components of FIG. 4.

Spread code generator 21 generates a repetitive pseudo-random spreading code of predetermined number of bits. As an example, in the describing of the operation of the components of the satellite 3 or transceiver 12 we will employ a 7-bit code. The transmitted data is coupled to EXCLUSIVE-OR gate 22 and, as an example, is shown in Curve A of FIG. 5. This transmitted data is combined in the EXCLUSIVE-OR gate 22 with the spreading code from generator 21 which has the characteristics shown in Curve B of FIG. 5. The output of the EXCLUSIVE-OR gate 22 is as is shown in Curve C of FIG. 5 and is coupled to differential encoder 23. It should be pointed out that gate 22 functions to superimpose the transmit data of Curve A, FIG. 5 on the spreading code of Curve B, FIG. 5. The 7-bit spreading code is repeated once for each data bit. The EXCLUSIVE-OR logic function inverts the spreading code for a data bit of "1" and leaves it uninverted for a data bit of "0" as illustrated in Curve C of FIG. 5. The combined data and spreading code output of gate 22 is coupled to differential encoder 23. The communication system of the present invention modifies the phase of the carrier to transmit data. Between transmission and reception the signal may undergo a phase inversion. This phase inversion is unpredictable and depends on the physical environment of the path that the signal travels. Instead of transmitting the spreading code directly, encoder 23 encodes the data in a way that provides immunity from phase inversion. The phase of the current bit of the encoded data depends on the change in phase of the current bit and the previous bit rather than on absolute phase of the current bit. This differentially encoded combined data and spreading code is shown in Curve D of FIG. 5.

The output of encoder 23 is coupled to biphase modulator 24 which is also coupled to local oscillator 25 producing, for example, a 2.4 GHz carrier. The output of oscillator 25 is a sine wave signal. The encoded data output from the biphase modulator 24 changes the phase of the carrier signal. The unaltered carrier transmits a "0". Inverting the carrier (180 degree phase shift) transmits a "1". The output of modulator 24 is coupled to amplifier and filter 26 which amplifies the input signal to one watt radiated power and attentuates the radiation of frequencies outside the 150 MHz band centered on 2.4 GHz.

Figure 6:
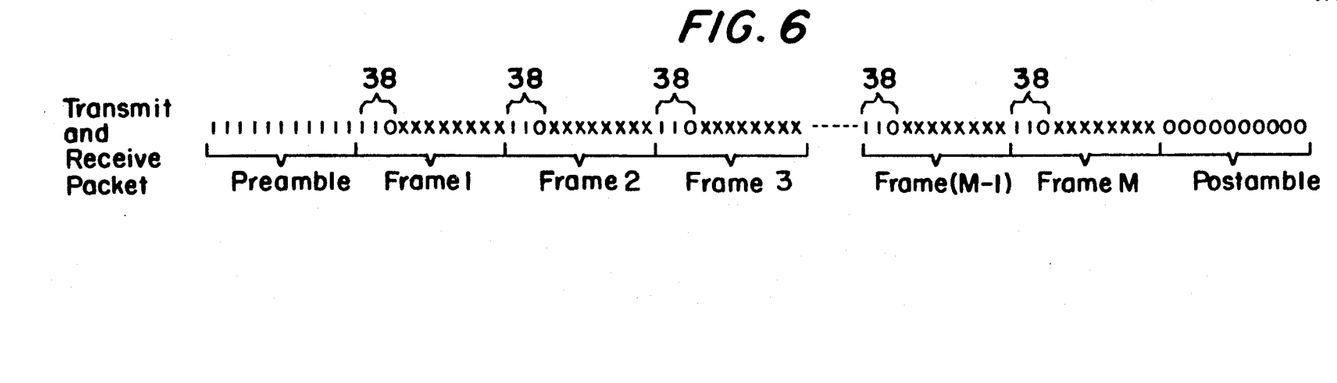
FIG. 6 is a timing diagram illustrating the transmit and receive packet in accordance with the principles of the present invention.

The transmit and receive packet of the satellite 3 and relay 4 of FIG. 1 and the transceiver 12 and relay transceiver 15 of FIG. 3 is shown in FIG. 6.

The waveform at the output of amplifier 26 is radiated from the unidirectional antenna 5 or 13.

Figure 7:
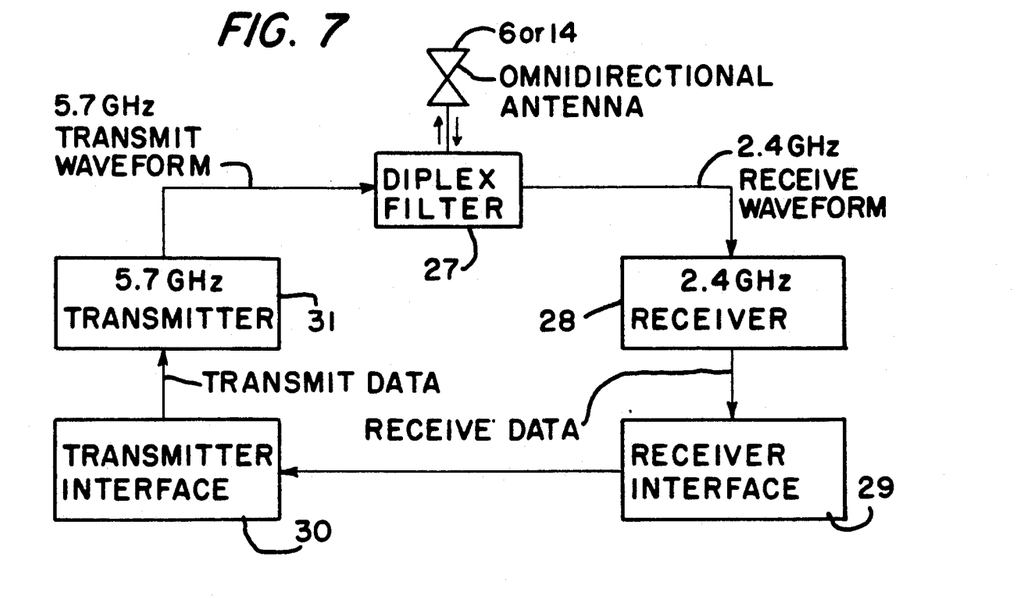
FIG. 7 is a block diagram of the relay of FIG. 1 and the relay transceiver of FIG. 3.

Referring to FIG. 7, the omnidirectional antenna 6 or 14 of FIGS. 1 and 3, respectively, receives the signals radiated from the unidirectional antennas 5 of FIG. 1 or the unidirectional antennas 13 of FIG. 3 which couple the receive signal to diplex filter 27. The omnidirectional antenna employed in relay 4 or relay transceiver 15 simultaneously receives a 2.4 GHz signal and transmits a 5.7 GHz signal. The diplex filter 27 makes this possible by blocking out all frequencies outside the 2.4 GHz band on the receive path and preventing any radiation outside the 5.7 GHz band from entering back into the transmit path. The received signal output of filter 27 is coupled to a 2.4 GHz receiver 28 which functions identically to the 5.7 GHz receiver in satellite 3 or transceiver 12 except that it receives in the 2.4 to 2.484 GHz band.

The receiver interface 29 and transmitter interface 30, according to the ARCNET protocol, are identical to those in the satellite 3 and transceiver 12. The 5.7 GHz transmitter 31 coupled to the output of interface 30 functions identically to the 2.4 GHz transmitter in the satellites 3 and transceivers 12 except that it transmits on the 5.7 to 5.85 band.

Referring again to FIG. 4, the signal transmitted from relay 4 or relay transceiver 15 is received on the unidirectional antenna 5 or 13 and coupled to the filter, amplifier, downconverter and level controller 32 of the receiver of the satellite 3 or transceiver 12. The component 32 is a conventional wideband front end microwave receiver which converts the received waveform down to an intermediate frequency of 150 MHz. The output of the component 32 is coupled to demodulator 33 which extracts the combined "data ⊕ code" waveform from the 150 MHz modulated carrier by comparing the phase of the current bit with the phase of the previous bit. The differential encoder 23 has generated the encoded data as the difference in the phase of successive bits of the "data ⊕ code" signal. A device in the demodulator 33 called a delay line delays the 150 MHz modulated carrier one bit period. A bit period is the time required to transmit a single code bit. A phase detector in demodulator 33 compares the delayed signal with the undelayed signal. The output of the phase detector is the "data ⊕ code" waveform. The "data ⊕ code" waveform is a bipolar pulse train (+or −) of varying amplitude. The pulse train also contains disruptive noise added during the propagation of the signal between the satellite 3 or transceiver 12 and its associated relay 4 or relay transceiver 15. The output from demodulator 33 is coupled to an analog-to-digital converter 34 which samples the encoded data waveform at the output of demodulator 33 at twice the bit rate of the encoded data. The amplitude of the input pulse train thereto, either +or −, is expressed as a digital number. The analog-to-digital converter 34 splits the data stream into two channels of alternating samples. The resulting two data streams have samples taken at the bit rate but offset in time by one-half the bit period. Each satellite or transceiver runs on its own digital clock so there is no synchronization between the bits of the transmitted signal and the samples taken by converter 34. Since the converter 34 takes its samples at twice the bit rate of the encoded data, one of the two channels at the output of converter 34 will always have the correct bit amplitude. The synchronization and tracking logic, to be described later, will decide which is the correct channel.

The output of converter 34 is coupled to dual correlator 35. A separate correlator receives the data waveform samples from each of the two converter 34 channels. Each correlator matches its stream of samples against a stored copy of the spreading code. At each bit period the correlators measure how well the preceding 7 data-waveform samples match the spreading code. Because each data bit requires 7 code bits, the correlators will indicate one strong match, or a correlation peak, every 7 bit periods. The correlation peaks from one correlator may not occur at the same time as the correlation peaks from the other correlator. The synchronization and tracking logic will follow whichever channel has the highest correlation peak (strongest match). The transmitter sends an inverted spreading code for a data bit of "1" and an uninverted code for a data bit of "0". A data bit of "1" produces a large negative correlation peak at the output of the active correlator. A data bit of "0" produces a large positive peak. The synchronization and tracking logic decodes the receive data as a "1" if the polarity of the correlation peak is negative and as a "0" if the polarity is positive.

The output of correlators 35 is coupled to the input of the synchronization and tracking circuit 36 which must find the beginning of each packet of data and must repeatedly choose the correct correlator output from correlator 35. Finding the beginning of the packet means distinguishing "blank air" noise from a transmitted signal (synchronization). Choosing the correct correlator means selecting whichever correlator has the strongest match at any point in time (tracking). This will be described in greater detail hereinbelow.

The output of circuit 36 is coupled to interface 37 which is the ARCNET receive interface. The interface 37 buffers the receive data and generates the pulse train for the cable driver 19. If one or more of the data bits is in error, interface 37 will pass the errors through to the ARCNET card 10 of FIG. 1 or the ARCNET card 17 of FIG. 3 in the receiving personal computer. The ARCNET card 10 or 17 in the receiving personal computer will detect the errors and not acknowledge the packet. The receiving ARCNET card acknowledges a packet by sending a special short packet back to the transmitting ARCNET card. The receiving card uses extra bits at the end of a packet to detect the presence of errors anywhere in the packet. If the receiving card detects errors and does not acknowledge the packet, the sending personal computer will then know to retransmit the packet. Interface 37 also determines when a packet ends by deleting 10 data bits of "0" in the packet postamble as shown in FIG. 6.

Let us now go into more detail with respect to the synchronization and tracking circuit 36 of FIG. 4. The synchronization and tracking logic of circuit 36 employed in the communication system of the present invention has two jobs. It finds the beginning of a transmission packet and it repeatedly selects whichever of the two correlators in correlator 35 has valid data. The logic of circuit 36 is designed for the following conditions: (1) The transmission packet contains a series of preamble data bits with a selected binary valid. For purposes of illustration, the preamble contains all "1" as illustrated in FIG. 6. The transmission packet also has a predetermined number of data frames as defined in (2) below. (2) Each data frame within a packet begins with a framing bit sequence of a predetermined number of bits each of which has a predetermined binary condition. For instance, the framing bit sequence may be 3 bits having the conditions "1", "1", "0", as illustrated at 38 of FIG. 6. As also illustrated in FIG. 6, each frame has 8 data bits. (3) A strong correlation peak, corresponding to a single data or framing bit, occurs every N code bit periods. And (4) the receiver clock will be slightly faster or slightly slower than the transmitter clock.

The logic of circuit 36 looks for a correlation peak greater than a predetermined threshold. If the data it finds when the correlation is greater than the threshold is a data bit of "1", it takes the data as potentially valid data. If it finds a predetermined number of "1"s in an uninterrupted sequence of valid data bits of a predetermined number, it assumes it has found the beginning of the packet. When it finds the next data bit "0", then it knows that the preamble has ended and the "0" is the first data bit of the packet. The receiver is now synchronized to the transmitter. Synchronization is never more than temporary because it is difficult to built a transmitter clock and receiver clock so that their rates will be exactly the same. When the first correlator begins to lose synchronization, the correlation peak of the second correlator will start to increase as the first correlator's peak is decreasing. When the second correlator's peak, for two data bits in a row, is stronger than the peak of the first correlator, the second correlator will become the active correlator. The logic continues this tracking scheme until 10 data bits of "0" mark the end of the packet as indicated in FIG. 6 as being the postamble.

Figure 8:
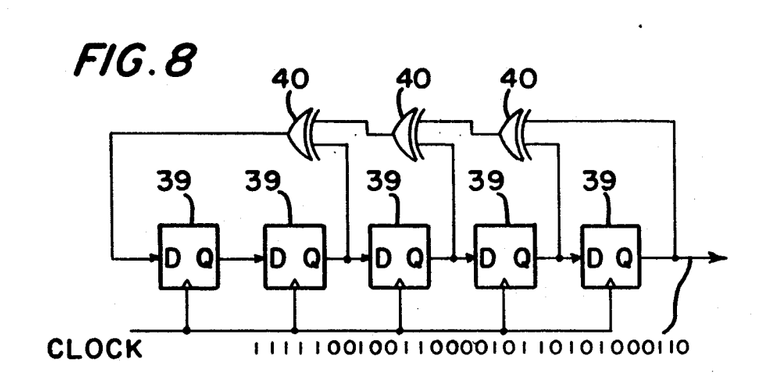
FIGS. 8 and 9 show embodiments of the spreading code generator of FIG. 4.
Figure 9:
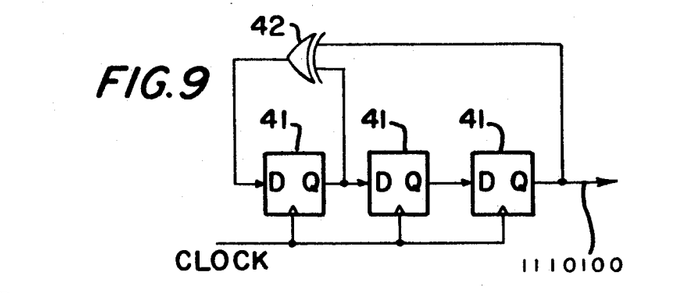

Referring to FIGS. 8 and 9, there is disclosed therein block diagrams of two possible embodiments of the spreading code generator 21 of FIG. 4. The embodiment of FIG. 8 includes five D-type flip-flops 39 connected in a string and connected in the manner illustrated to three EXCLUSIVE-OR gates 40 which generate a 31 bit code as illustrated. As mentioned previously, the spreading code of generator 21 may have any number of bits depending upon the desired protection against multipath fading and interference. In FIG. 9 there is illustrated the code generator 21 for the example being employed herein, namely, a 7 bit spreading code. This circuit includes three D-type flip-flops 41 connected as illustrated to an EXCLUSIVE-OR gate 42 to generate the 7 bit code as illustrated in FIG. 9 and Curve B of FIG. 5.

Figure 10:
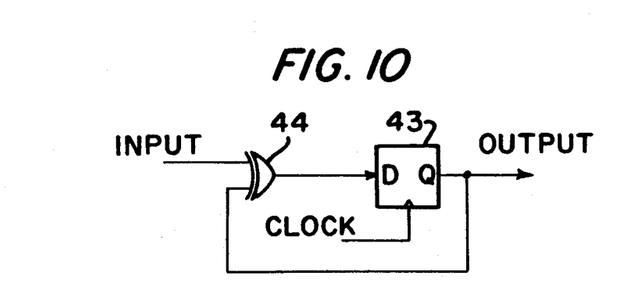
FIG. 10 is a block diagram illustrating one embodiment of the differential encoder of FIG. 4.

Referring to FIG. 10, there is illustrated there in one embodiment of the differential encoder 23 of the transmitter of FIG. 4. The differential encoder may include one D-type flip-flop 43 and an EXCLUSIVE-OR gate 44 connected as illustrated to generate the encoded data $\oplus$ code.

Figure 11:
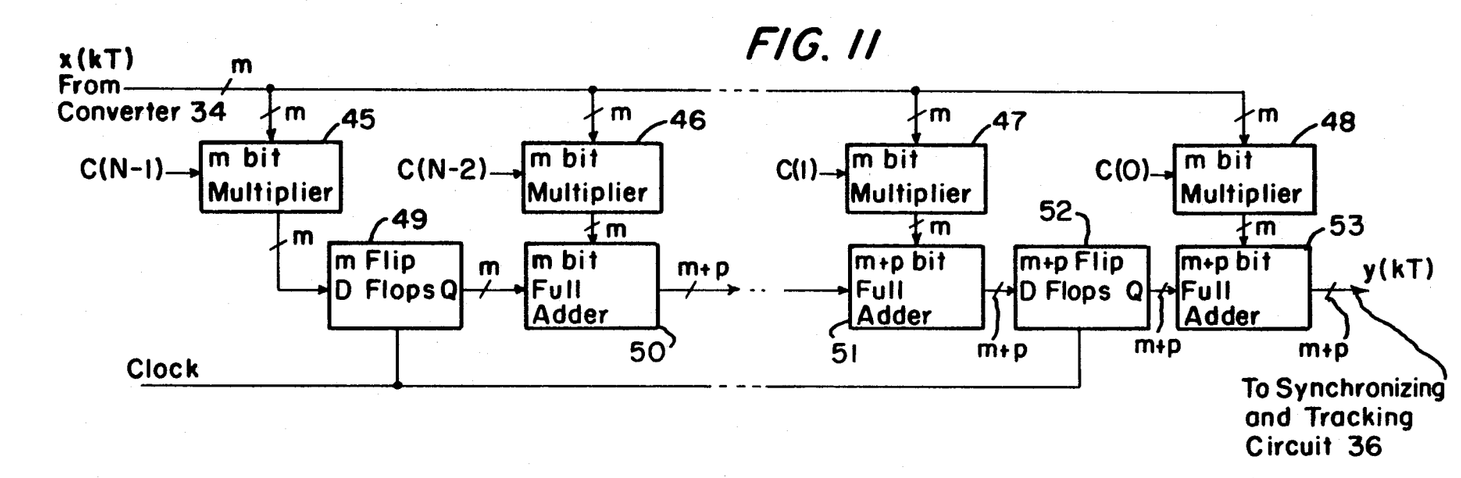
FIG. 11 is a block diagram of one embodiment of the correlators of the dual correlator of FIG. 4.

Referring to FIG. 11, there is illustrated therein one embodiment of one of the correlators of dual correlator 35 of FIG. 4. This block diagram would be repeated for the second correlator of correlator 35.

The correlator includes an m number of conductors coming from converter 34 on one of the outputs therefrom with each of the conductors m carrying one of the binary bits from converter 34. These m bits are connected to m bit multipliers 45, 46, 47 and 48 with the bits being multiplied with a coefficient binary output derived from a copy of the spreading code generated in generator 21. The coefficient C coupled to each of the multipliers 45-48 will have a value $-1$ or a value $+1$ depending on the value of the spreading code, where the $-1$ is derived from a $(-1)^1$ and the $+1$ is derived from the spreading code having a digit of $(-1)^0$. The outputs of multiplier 45 is coupled to the D input of m flip-flops 49 whose outputs are coupled to an m bit full adder 50 which adds the output of flip-flops 49 to the output of multiplier 46. This process is repeated for multipliers 47 and 48 by means of (m+p) full adder 51, (m+p) flip-flops 52 and the (m+p) full adder 53. The output of full adder 53 is coupled to the synchronizing and tracking circuit 36 and has a value of y(kT) while the input to this correlator from converter 34 is x(kT).

In the above, and in FIG. 11 the equations and letter symbols are as follows.

N = number of stages = number of bits in spreading code
$r_i$ = $i^{th}$ bit of spreading code
$C(i) = (-1)^{r_i}$
T = sampling period
k = sample number
t = continuous time
p is defined as the number for which $2^{p-1} < N <$ or $= 2^p$ And the equations are:

$$t = kT$$

$$y(kT) = \sum_{i=0}^{n-1} c(i) \times [(k-i)T]$$

Figure 12:
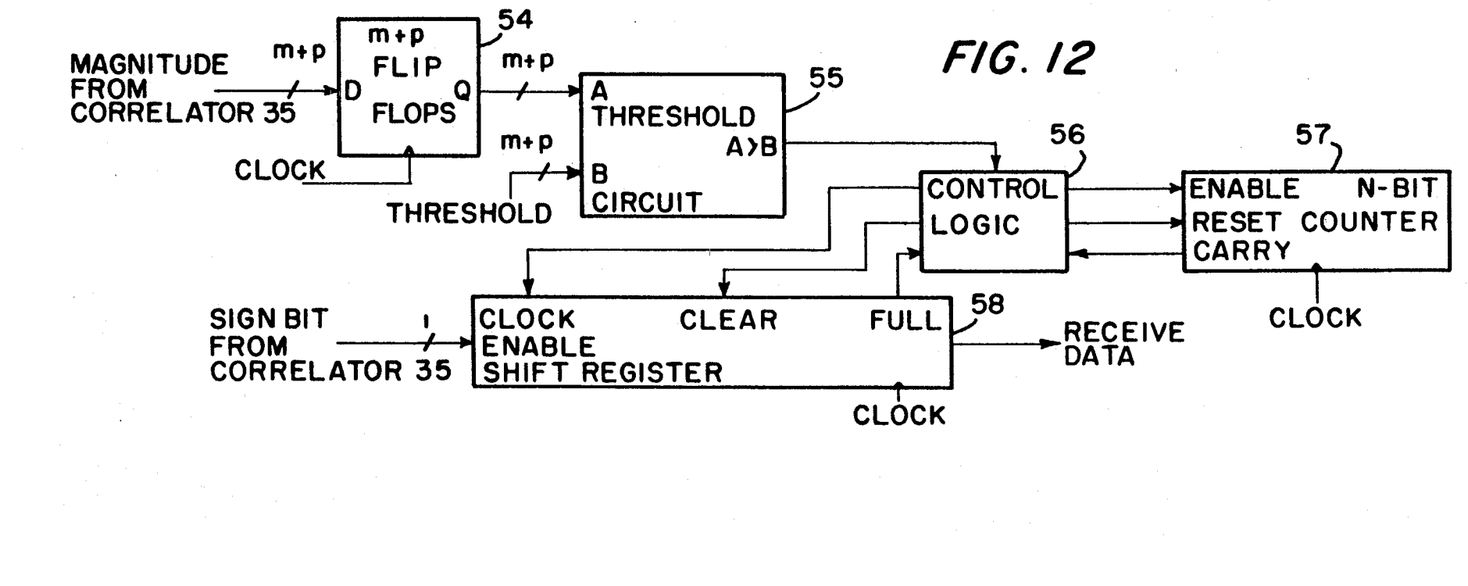
FIG. 12 is a block diagram illustrating one embodiment of one of the circuits of the synchronization and tracking circuit of FIG. 4.

Referring to FIG. 12, there is illustrated therein a block diagram of one of the synchronizing circuits employed in the synchronization and tracking circuit 36. The magnitude of the output from correlator 35 is coupled on (m+p) input lines to (m+p) D-type flip-flops 54. The outputs of the flip-flops 54 are coupled of (m+p) inputs to threshold circuit 55 whose (m+p) threshold input values are coupled thereto. An output from the threshold circuit 55 is provided when the input from the flip-flops 54 is greater than the threshold applied to the threshold circuit (A >B). The output from threshold circuit 55 is coupled to the control logic 56 which controls the N bit counter 57 and the shift register 58. The input to register 58 is the sign bit represented by the most significant bit of the digital output on the particular output channel of correlator 35. The length of shift register 58 is the number of bits required to accept the preamble of the packet as shown in FIG. 6. For example the preamble is accepted when 7 bits out of 11 bits of; the preamble are present.

Figure 13:
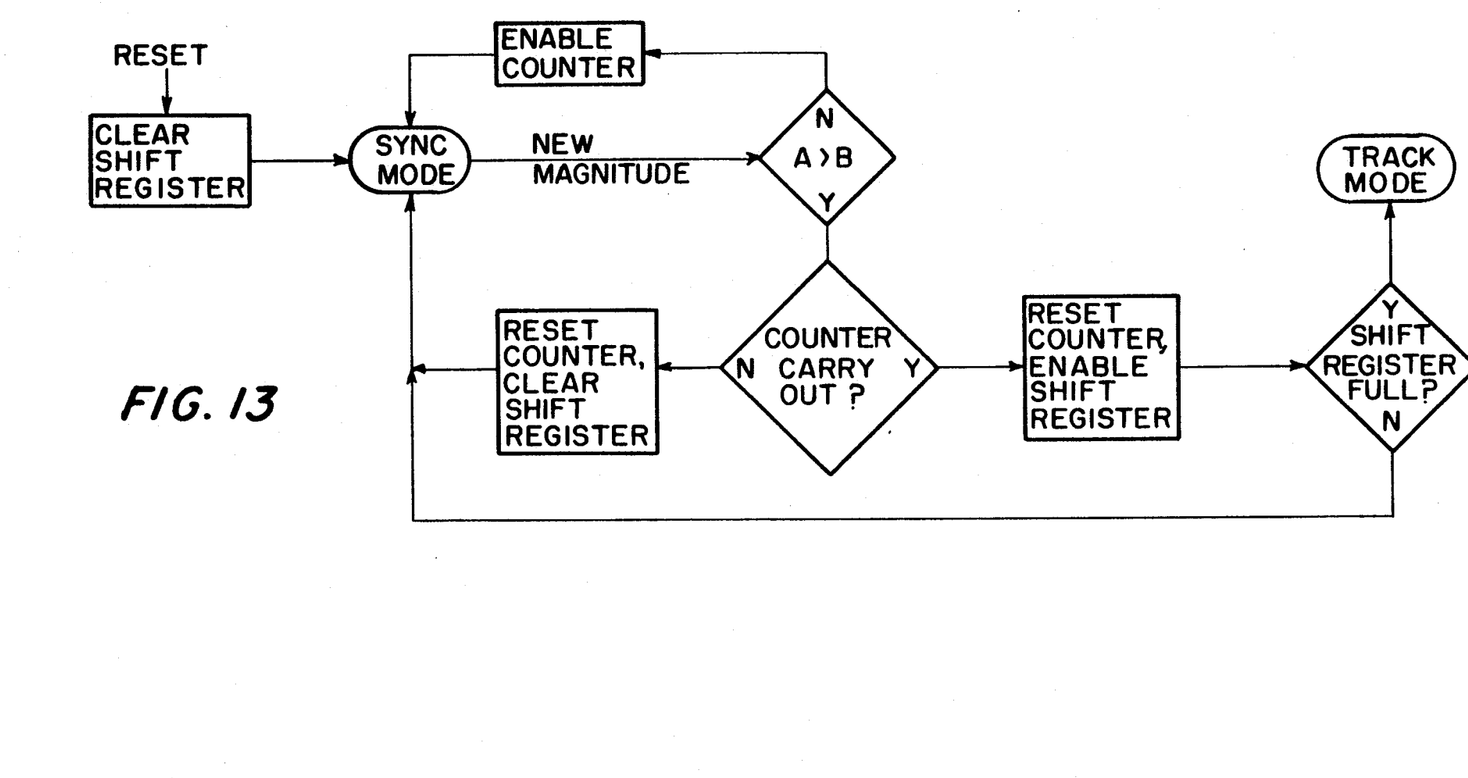
FIG. 13 is a flow chart illustrating the operation of the synchronization circuit of FIG. 12.

A flow diagram illustrated in FIG. 13 illustrates the operation of the synchronizing circuit of FIG. 12.

It should be kept in mind that the synchronizing circuit may take other forms and is not restricted to the circuit illustrated in FIG. 12.

While we have described above the principles of our invention in connection with specific apparatus, it is to be clearly understood that this description is made only by way of example and not as a limitation to the scope of our invention as set forth in the objects thereof and in the accompanying claims.

We claim:
1. A local area network comprising:
a plurality of satellites disposed within a given geographic area, each of said plurality of satellites being connected to selected ones of computers, word processors, printers and other related equipment as well as digitally encoded audio signals and at least one unidirectional antenna, each of said plurality of satellites having a first transmitter coupled to said unidirectional antenna transmitting first signals at a first frequency to others of said plurality of satellites according to a predetermined protocol and a first receiver coupled to said unidirectional antenna receiving second signals at a second frequency from said others of said plurality of satellites according to said predetermined protocol, said first and second frequencies being different; and
a relay disposed in said geographic area having an omnidirectional antenna, each of said unidirectional antennas of said plurality of satellites being in focused communication with said omnidirectional antenna, a second receiver coupled to said omnidirectional antenna to receive said first signals according to said predetermined protocol and a second transmitter coupled to said second receiver and said omnidirectional antenna to convert said first signals to said second signals and to transmit said second signals to said others of said plurality of satellites according to said predetermined protocol;
each of said first and second signals including digital data combined with a single predetermined pseudo-random spreading code having N bits common to all of said plurality of satellites, where N equals to a predetermined number greater than two.
2. A network according to claim 1, wherein said first transmitter includes a source of digital data having a given bit rate for transmission, a code generator to produce said spreading code having a bit rate greater than said given bit rate, and a first means to combine said digital data and said spreading code such that such said spreading code is inverted when a data bit is "1" and said spreading code is not inverted when a data bit is "0".

3. A network according to claim 2, wherein said first transmitter further includes a differential encoder coupled to the output of said first means, a source of carrier signal at said first frequency, and a biphase modulator coupled to said differential encoder and said source of carrier signal to provide said first signals.

4. A network according to claim 3, wherein said first receiver includes second means coupled to said unidirectional antenna responsive to said second signal to recover therefrom a waveform containing said combined data and spreading code, third means coupled to said second means to sample the amplitude of said waveform at a predetermined rate greater than said given bit rate and provide two channels of alternating samples expressed in digital form, fourth means coupled to said third means to match said digital samples of each of said two channels against a signal produced from a stored copy of said spreading code, and fifth means coupled to said fourth means to respond to the strongest match occurring in said two channels and to detect the beginning of said digital data to recover said digital data.

5. A network according to claim 4, wherein said fourth means includes a pair of correlators each coupled to a different one of said two channels, each of said pair of correlators matching its stream of samples against said signal produced from a stored copy of said spreading code and determining how well the preceding said predetermined number of bits of said samples match said spreading code, each of said pair of correlators providing a correlation peak indicating a strong match independent of each other every N bit periods.

6. A network according to claim 5, wherein said first and second signals further include a predetermined number of preamble bits having the same binary value indicating the beginning of a data packet, and said fifth means includes sixth means coupled to said pair of correlators to detect a given number of said predetermined number of said preamble bits, seventh means coupled to said pair of correlators to detect predetermined binary conditions of a given number of bits disposed at the beginning of each frame of said data packet, and eighth means coupled to said pair of correlators to detect said correlation peak at the output of said pair of correlators, said sixth, seventh and eighth means cooperating to synchronize said first receiver to said first transmitter transmitting said combined data and spreading code received by said first receiver.

7. A network according to claim 1, wherein said first receiver includes first means coupled to said unidirectional antenna responsive to said second signal to recover therefrom a waveform containing said combined data and spreading code, second means coupled to said first means to sample the amplitude of said waveform at a predetermined rate greater than said given bit rate and provide two channels of alternating samples expressed in digital form, third means coupled to said second means to match said digital samples of each of said two channels against a signal produced from a stored copy of said spreading code, and fourth means coupled to said third means to respond to the strongest match occurring in said two channels and to detect the beginning of said digital data to recover said digital data.

8. A network according to claim 7, wherein said third means includes a pair of correlators each coupled to a different one of said two channels, each of said correlators matching its stream of samples against said signal produced from a stored copy of said spreading code and determining how well the preceding N bits of said samples match said spreading code, each of said pair of correlators providing a correlation peak indicating a strong match independent of each other every N bit periods.

9. A network according to claim 9, wherein said first and second signals further include a predetermined number of preamble bits having the same binary value indicating the beginning of a data packet, and said fourth means includes fifth means coupled to said pair of correlators to detect a given number of said predetermined number of said preamble bits, sixth means coupled to said pair of correlators to detect predetermined binary conditions of a given number of bits disposed at the beginning of each frame of said data packet, and seventh means coupled to said pair of correlators to detect the highest correlation peak at the output of said pair of correlators, said fifth, sixth and seventh means cooperating to synchronize said first receiver to said first transmitter transmitting said combined data and spreading code received by said first receiver.

10. A long distance communication system comprising:

a plurality of transceivers disposed in a given geographic area, each of said plurality of transceivers having at least one unidirectional antenna, a first transmitter coupled to said unidirectional antenna to transmit first signals at a first frequency to others of said plurality of transceivers according to a predetermined protocol and a first receiver coupled to said unidirectional antenna to receive second signals at a second frequency from said others of said plurality of transceivers according to said predetermined protocol, said first and second frequencies being different; and a relay transceiver disposed in said geographic area having an omnidirectional antenna, each of said unidirectional antennas of said plurality of transceivers being in focused communication with said omnidirectional antenna, a second receiver coupled to said omnidirectional antenna to receive said first signal according to said predetermined protocol and a second transmitter coupled to said second receiver and said omnidirectional antenna to convert said first signals to said second signals and to transmit said second signals to said others of said plurality of transceivers according to said predetermined protocol;

each of said first and second signals including digital data combined with a single predetermined pseudo-random spreading code having N bits common to all of said plurality of transceivers, where N equals a predetermined number greater than two.

11. A system according to claim 10, wherein
said first transmitter includes
- a source of digital data having a given bit rate for transmission,
- a code generator to produce said spreading code having a bit rate greater than said given bit rate, and
- a first means to combine said digital data and said spreading code such that said spreading code is inverted when a data bit is "1" and said spreading code is not inverted when a data bit is "0".

12. A system according to claim 11, wherein
said first transmitter further includes
- a differential encoder coupled to the output of said first means,
- a source of carrier signal at said first frequency, and
- a biphase modulator coupled to said differential encoder and said source of carrier signal to provide said first signals.

13. A system according to claim 12, wherein
said first receiver includes
- second means coupled to said unidirectional antenna responsive to said second signal to recover therefrom a waveform containing said combined data and spreading code,
- third means coupled to said second means to sample the amplitude of said waveform at a predetermined rate greater than said given bit rate and provide two channels of alternating samples expressed in digital form,
- fourth means coupled to said third means to match said digital samples of each of said two channels against a signal produced from a stored copy of said spreading code, and
- fifth means coupled to said fourth means to respond to the strongest match occurring in said two channels and to detect the beginning of said digital data to recover said digital data.

14. A system according to claim 13, wherein
said fourth means includes
- a pair of correlators each coupled to a different one of said two channels, each of said pair of correlators matching its stream of samples against said signal produced from a stored copy of said spreading code and determining how well the preceding N bits of said samples match said spreading code, each of said pair of correlators providing a correlation peak indicating a strong match independent of each other every N bit periods.

15. A system according to claim 14, wherein
said first and second signals further include a predetermined number of preamble bits having the same binary value indicating the beginning of a data packet, and
said fifth means includes
- sixth means coupled to said pair of correlators to detect a given number of said predetermined number of said preamble bits,
- seventh means coupled to said pair of correlators to detect predetermined binary conditions of a given number of bits disposed at the beginning of each frame of said data packet, and
- eighth means coupled to said pair of correlators to detect said correlation peak at the output of said pair of correlators,
- said sixth, seventh and eighth means cooperating to synchronize said first receiver to said first transmitter transmitting said combined data and spreading code received by said first receiver.

16. A system according to claim 10, wherein
said first receiver includes
- first means coupled to said unidirectional antenna responsive to said second signal to recover therefrom a waveform containing said combined data and spreading code,
- second means coupled to said first means to sample the amplitude of said waveform at a predetermined rate greater than said given bit rate and provide two channels of alternating samples expressed in digital form,
- third means coupled to said second means to match said digital samples of each of said two channels against a signal produced from a stored copy of said spreading code, and
- fourth means coupled to said third means to respond to the strongest match occurring in said two channels and to detect the beginning of said digital data to recover said digital data.

17. A system according to claim 16, wherein
said third means includes
- a pair of correlators each coupled to a different one of said two channels, each of said correlators matching its stream of samples against said signal produced from a stored copy of said spreading code and determining how well the preceding N bits of said samples match said spreading code, each of said pair of correlators providing a correlation peak indicating a strong match independent of each other every N bit periods.

18. A system according to claim 17, wherein
said first and second signals further include a predetermined number of preamble bits having the same binary value indicating the beginning of a data packet, and
said fourth means includes
- fifth means coupled to said pair of correlators to detect a given number of said predetermined number of said preamble bits,
- sixth means coupled to said pair of correlators to detect predetermined binary conditions of a given number of bits disposed at the beginning of each frame of said data packet, and
- seventh means coupled to said pair of correlators to detect the highest correlation peak at the output of said pair of correlators,
- said fifth, sixth and seventh means cooperating to synchronize said first receiver to said first transmitter transmitting said combined data and spreading code received by said first receiver.

* * * * *